United States Patent

[11] 3,620,980

[72] Inventors Evan Johnson Young
St. Albans;
Charles Gene Summers, Scott Depot, both of W. Va.

[21] Appl. No. 871,106
[22] Filed Aug. 1, 1969
[45] Patented Nov. 16, 1971
[73] Assignee Monsanto Company
St. Louis, Mo.
Original application Jan. 16, 1967, Ser. No. 609,335, now Patent No. 3,505,287, dated Apr. 7, 1970. Divided and this application Aug. 1, 1969, Ser. No. 871,106

[54] ASYMMETRICAL PHENOLIC NONDISCOLORING ANTIDEGRADANTS FOR POLYMERS
2 Claims, No Drawings

[52] U.S. Cl. .......... 252/404, 260/45.95, 260/619 A
[51] Int. Cl. .......... C08f 45/58
[50] Field of Search .......... 252/404; 260/45.95, 619 A

[56] References Cited
UNITED STATES PATENTS

| | | | |
|---|---|---|---|
| 2,899,394 | 8/1959 | Palfreeman .......... | 260/45.95 |
| 3,211,652 | 10/1965 | Hinkamp .......... | 260/45.95 |
| 3,355,419 | 11/1967 | Cook .......... | 260/45.95 |

*Primary Examiner*—Richard D. Lovering
*Assistant Examiner*—Irwin Gluck
*Attorneys*—Richard O. Zerbe and F. M. Murdock

ABSTRACT: Compounds of the formula

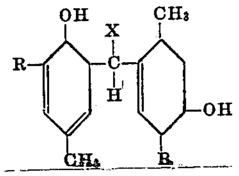

where R is secondary or tertiary alkyl and X is straight or branched chain primary, secondary, or tertiary alkyl, are excellent nondiscoloring antidegradants for rubber polymers. Mixtures containing isomers of these compounds are excellent nondiscoloring antidegradants.

ASYMMETRICAL PHENOLIC NONDISCOLORING ANTIDEGRADANTS FOR POLYMERS

This application is division of application Ser. No. 609,335, filed Jan. 16, 1967, now U.S. Pat. No. 3,505,287.

BACKGROUND OF THE INVENTION

The invention pertains to the field of antidegradants for olefin and diolefin polymers. Certain specific hydroxy compounds are known antidegradants. Known hydroxy compounds include bridged cresols of which the compound 4,4'-butylidenebis(6-tert-butyl-m-cresol) is a rubber antioxidant trademarked Santowhite powder. Santowhite Powder is a member of a family of antioxidants prepared by reacting a 2,5-dialkyl phenol with an aldehyde. The number position and kind of alkyl strongly influence antioxidant efficiency. Reacting aldehydes with dialkyl phenols having the alkyl groups in positions other than the 2- and 5-position may result in compositions not useful as antioxidants according to Beaver's U.S. Pat. No. 2,816,945 of Monsanto Company (1957). Ambelang studied the reaction of 2,5-dialkyl phenols with aldehydes to produce 4,4'-alkylidene-bis(6-tert-alkyl-m-cresols). "The Structure and Configuration of Dihydroxydiphenylmethanes Derived from Butylated m-Cresols as Evidenced by Infrared Absorption," Journal of the American Chemical Society 75, 947 (1953). He suggests the existence of unsymmetrical bis-6-tert-alkyl-m-cresols in which the alkylidene bridge is in the 2-position in one ring and in the 4-position in the other. No use for the products is disclosed. The compound 4-hydroxymethyl-2,6-di-tert-butyl-phenol is a rubber antioxidant trademarked Ionox 100. The compound 2,6-di-tert-butyl-4-methyl phenol is a rubber antioxidant trademarked Ionol. British Pat. No. 927,179 of the Ethyl Corporation published May 29, 1963, discloses methylenebis phenols and their use as antioxidants having at least one tertiary alkyl group of 4 to 9 carbon atoms positioned ortho to hydroxy and at least 1 positioned para to the methylene bridge. Insofar as the patent discloses methylenebis dialkyl phenols, all 4 alkyl groups are adjacent to hydroxy or 3 of them are adjacent to hydroxy and one para to hydroxy. The compound 4,4'-methylenebis-(2,6-di-tert-butyl phenol) is a rubber antioxidant trademarked Ethyl Antioxidant 702. The compound 2,2'-methylenebis(4-methyl-6-tert-butyl phenol) is an antioxidant trademarked Antioxidant 2246. In the methylenebis 2,4-dialkyl phenols, it is pointed out by Davis that increasing the size of the methylene bridge adversely affects the activity of the compound as an antioxidant. U.S. Pat. No. 2,538,355 of the American Cyanamid Company (1951).

An antidegradant which is nondiscoloring to a polymer and has good stabilization against oxygen degradation is necessary for raw polymers. The compound and compound mixtures of our invention display both of these properties. They are at least equivalent to the most effective prior art compounds in both properties and superior in one.

SUMMARY

Compounds of the formula

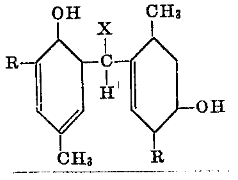

where R is secondary or tertiary alkyl and X is straight or branched chain primary, secondary, or tertiary alkyl, are excellent nondiscoloring antidegradants for rubber polymers. Mixtures containing isomers of these compounds are also excellent nondiscoloring antidegradants.

In the rubber industry it is customary to add an antidegradant during compounding of vulcanizable stocks. Polymers obtained by solution or emulsion polymerization must be protected immediately after polymerization because they may be stored in bales of raw polymer for a month or more before the polymer is compounded and cured for consumer use. The baled polymer must contain a stabilizer to prevent degradation. When consumer use is for a white pigmented or nonfilled polymer product, the baled raw polymer is useless for this purpose if it has become discolored. The use of compounds or mixtures of this invention in raw polybutadiene provides a nondiscolored polymer with good stabilization against oxygen degradation. The use of compounds of mixtures of this invention in raw polybutadiene is an improvement over the prior art.

Antioxidant 2246 discolors polybutadiene during aging. Santowhite Powder is essentially nondiscoloring in polybutadiene but is derived from the relatively scarce and expensive meta-cresol. The new bridged cresols are nondiscoloring to the baled raw polymer and more effective stabilizers than Santowhite Powder. At the same time economy in production is achieved. The most economical antioxidants comprise compound mixtures which contain as essential ingredients the new unsymmetrical bridged cresols.

An example of the new compound is 2-[alpha, alpha-(4-hydroxy-2-methyl-5-tert-butyl phenyl)butyl]-6-tert-butyl-p-cresol of the formula

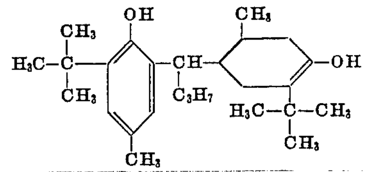

The mixtures containing the new compounds may be prepared by reacting a mixture of 6-alkyl-m-cresol and 2-alkyl-p-cresol with an aliphatic aldehyde of 2 to 7 carbon atoms. For example, mixtures of compounds obtained when about 2 parts of alkylated m-cresol and 1 part of alkylated p-cresol are bridged with an alkylidene group of 2 to 7 carbons, and in which the alkyl group on the cresols contains from 4 to 12 carbon atoms are excellent stabilizers. An example of this type of mixture is the reaction product obtained when a mixture of tert-butyl-m-cresol and tert-butyl-p-dresol is bridged with n-butyraldehyde. This mixture contains 2,2'-butylidenebis (6-tert-butyl-p-cresol), 4,4'-butylidenebis(6-tert-butyl-m-cresol) and 2-[alpha, alpha-(4-hydroxy-2-methyl-5-tert-butyl phenyl)butyl]6-tert-butyl-p-cresol.

PREFERRED EMBODIMENTS

To prepare 2-[alpha, alpha-(4-hydroxy-2-methyl-5-tert-butyl phenyl)]-6-tert-butyl-p-cresol, 82 grams (0.5 mole) of 2-tert-butyl-p-cresol and 82 grams (0.5 mole) of 6-tert-butyl-m-cresol are charged into a gas-sparger-equipped reaction flask. Methanol (100 ml.) is added and gaseous hydrogen chloride (0.4 mole) is fed into the stirred solution for about 1 hour. Forty grams of n-butyraldehyde (0.56 mole) is added in 1 hour at 45° C. The reaction mixture is stirred an additional 2 hours at 60°–70° C. The reaction mixture is cooled to 30° C. and 100 grams of water is added and the mixture is stirred. After stirring for 5 minutes, the aqueous phase is decanted. The organic phase is washed with two 150 gram portions of water. At this stage of the process, the batch may be steam sparged to remove residual tert-butyl-m-cresol and tert-butyl-p-cresol. The reaction product contains about 41 percent 2-[alpha, alpha-(4-hydroxy-2-methyl-5-tert-butyl phenyl)butyl]-6-tert-butyl-p-cresol, about 27.7 percent 4,4'-butylidenebis(6-tert-butyl-m-cresol), and about 26 percent 2,2'-butylidenebis(6-tert-butyl-p-cresol). The product mixture is slurried in 100 grams of hydrocarbon solvent and filtered to remove 4,4'-butylidenebis(6-tert-butyl-m-cresol). The filtrate is warmed to 30°–40° C. and treated with about 5 grams of Super Filtrol clay for decolorization. Filtrol is a trademark for chemically treated colloidal clay for decolorizing and purifying. The mixture is filtered and the filtrate is vacuum stripped up to about 100° C./30 mm. Hg. The product is recrystallized with a hydrocarbon solvent to isolate the compound 2-[alpha, alpha-(4-hydroxy-2-methyl-5-tert-butyl phenyl)butyl]-6tert-butyl-p-cresol. Twenty-seven grams of the white solid compound is obtained. The melting point of a sample recrystallized twice in hydrocarbon solvent is 130°–131° C. The empirical formula of the compound is $C_{26}H_{38}O_2$. The molecular weight is 382.59. The compound elutes at 260° C. on a programmed vapor phase chromatograph when 4,4'-butylidenebis(6-tert-butyl-m-cresol) elutes at 270° c. Other compounds of this invention are prepared in a similar manner to the preparation described above.

The mixtures from which the compounds of this invention are isolated are valuable antioxidants. However, it is preferred to employ a higher ratio of 6-tert-butyl-m-cresol to decrease discoloration problems in the polymer. Also, mixtures of m- and p-cresols in a ratio of about 2:1 are available from coal tar fractions and are economical to use.

Essentially nondiscoloring economical mixtures of compounds comprise by weight 15 to 50 percent 4,4'-alkylidenebis(6-tert-alkyl-m-cresol), 10 to 20 percent 2,2'-alkylidenebis(6-tert-alkyl-p-cresol), and 40 to 55 percent 2-[alpha, alpha-(4-hydroxy-2-methyl--tert-alkyl-phenol)alkyl]-6-tert-alkyl-p-cresol. Antioxidant efficiency and safety from discoloration are improved by isolating and using the last named component but in most instances the mixtures are satisfactory. The first named component is insoluble in petroleum hydrocarbon solvents. The major portion of it can be removed by treating the reaction product with a petroleum hydrocarbon solvent and removing undissolved solids by filtration. The mixtures of this invention are prepared in a similar manner to the preparation described above. The ratio of the cresols may vary.

An example of a mixture preparation is the reaction of 2 parts of tert-butyl-m-cresol and 1 part of tert-butyl-p-cresol with n-butyraldehyde. The mixture product of this reaction contains about 14 percent 2,2'-butylidenebis(6-tert-butyl-p-cresol), about 48 percent 4,4 -butylidenebis(6-tert-butyl-m-cresol), and about 42 percent 2-[alpha, alpha-(4-hydroxy-2-methyl-5-tert-butyl pheyl)butyl]-6-tert-butyl-p-cresol. In a vapor phase chromatographic analysis of the mixture, the elution time for 2,2'-butylidenebis(6-tert-butyl-p-cresol) is 3 minutes, for 2-[alpha, alpha-(4-hydroxy-2-methyl-5-tert-butyl phenyl)butyl]-6-tert-butyl-m-cresol) in 4.15 minutes, and for 4,4'-butylidenebis(6-tert-butyl-m-cresol) is 6.15 minutes. The analysis is carried out in a 4-foot column with a ¼-inch diameter. The column is packed with 3 silicone gum rubber (trademarked SE-52) on Chromosorb W. Chromosorb W is a trademark for a white diatomaceous earth support. The temperature of the column is 260° C. The carrier gas is helium. The flow rate of the helium is 125 ml./minute.

A mixture of this invention is prepared by alkylating 2 parts of m-cresol and 1 part of p-cresol with Gulf Propylene Trimer. Gulf Propylene Trimer is a narrow boiling $C_9$ olefin fraction obtained from the catalytic polymerization of propylene. It is a liquid highly reactive monoolefin, low in peroxides and sulfur, and suitable for alkylation and other olefinic reactions. Alkylation is effected by heating 10 gram mols. of the cresol mixture, 12.5 gram mols. of propylene trimer, and 104 grams of Retrol, an acid activated absorbent clay, at 108°–130° C. The reaction is continued until 68 percent conversion to alkylate and then the reaction mixture is distilled. The mixture of 6-nonyl-m-cresol and 2-nonyl-p-cresol, b.p. 188°–200° C./30 mm. Hg, is bridged with n-butyraldehyde in the manner previously described. Products prepared by alkylating mixtures of m- and p-cresol upon condensation with an aldehyde yield mixtures of this invention substantially identical to those prepared from mixtures of pure alkyl-m-cresol and pure alkyl-p-cresol.

Stabilizers of this invention are mixed with raw solution or emulsion polymers while the polymers are in their dissolved or emulsified state. Solvent is evaporated from the solution polymer at room temperature. The solution polymer can be steam-distilled to remove solvent. In steam distillations, lower boiling antidegradants such as Ionol often distill out of the polymer. It is advantageous to use compounds or mixtures of this invention when steam distillation is used because they do not distill out of the polymer. The emulsion polymer is isolated from water by coagulation. The polymers are then milled at 50° C., blended nine times at a mill setting of 0.008 in., then sheeted out between 1/16 and ⅛-inch thickness. The sheets are cut into 25 to 30 gram samples and aged in a covered pan. Color and Mooney Viscosity data are obtained from these samples.

The stability of raw polymers wherein the compounds or mixtures of this invention are used is measured by the change in Mooney Viscosity. The Mooney Viscosity Test has the American Society for Testing Materials Designation, D1646-63. The data below illustrate aging of raw polymers with and without the stabilizers of this invention. Data for known antioxidants are included for comparison purposes.

Color is evaluated by visual observation. In color tests, the most desirable color is colorless. The code for the color characteristics in the Tables below is as follows:

C=Colorless
LY=Light Yellow
VLY=Very Light Yellow
A=Amber
LA=Light Amber
VLA=Very Light Amber
B=Equal to Untreated Polymer In some instances the rubber itself is colored and B designates that the treated polymer is equal to the untreated control. Company X, Company Y, and Company Z in the tables stand for commercial polybutadiene from different manufacturers. The unstabilized polybutadiene cements of Company X and Company Y are light amber color. Company Z's unstabilized polybutadiene cement is colorless.

TABLE I.—POLYBUTADIENE AGING, 100° C.

| | | Polybutadiene | | | |
|---|---|---|---|---|---|
| | | Company X | | Company Y | |
| Compound at 0.5 phr. | Aging time, hrs. | Mooney viscosity | Color, 48 hrs | Mooney viscosity | Color, 48 hrs. |
| Antioxidant 2246 | 0 | 44 | DA | 42 | DA |
| | 16 | 42 | | 37 | |
| | 30 | 41.5 | | 37 | |
| | 48 | 42 | | 35 | |
| 2,2'-butylidenebis-(4-methyl-6-tert-butyl phenol) | 0 | 44.5 | A | 42 | DA |
| | 16 | 34 | | 26 | |
| | 30 | 44 | | 29 | |
| | 48 | 46 | | 47 | |
| Mixture of this invention [1] | 0 | 45.5 | B | 42 | B |
| | 16 | 36.5 | | 38 | |
| | 30 | 46.5 | | 37 | |
| | 48 | 53 | | 55 | |

| | | | |
|---|---|---|---|
| 2-[alpha, alpha-(4-hydroxy-2-methyl-5-tert-butyl phenyl)butyl]-6-tert-butyl-p-cresol | 0 | 45.5 B | 43 B |
| | 16 | 37.5 | 37 |
| | 30 | 42.5 | 34 |
| | 48 | 55.5 | 39 |
| Santowhite powder | 0 | 45.5 B | 43 B |
| | 16 | 40 | 45 |
| | 30 | 53 | 56 |
| | 48 | 68 | 71 |
| Blank | 0 | (2) | (2) |
| | 16 | (2) | (2) |
| | 30 | (2) | (2) |
| | 48 | (2) | (2) |

[1] The mixture contains 18% 2,2'-butylidenebis (6-tert-butyl-p-cresol, 53% 2-[alpha, alpha-(4-hydroxy-2-methyl-5-tert-butyl phenyl) butyl]-6-tert-butyl-p-cresol and 17% 4,4'-butylidenebis(6-tert-butyl-m-cresol).

[2] Crumbled on mill.

The polybutadiene stocks in Table II contain the following:

Stock
1 Mixture of this invention containing 17% 4,4'-butylidenebis(6-tert-butyl-m-cresol -tert-butyl-M-cresol), % 2,2'-butylidenebis(6-tert-butyl-p-cresol), and 55% 2-[alpha, alpha-(4-hydroxy-2-methyl-5-*tert*-butyl phenyl)butyl]-6-tert-butyl-p-cresol
% 2 Antioxidant 2246
3 2-[alpha-(alpha-(4-hydroxy-2-methyl-5-tert-butylphenyl)butyl]-6-tert-butyl-p-cresol
4 Santowhite Powder
5 Ionol
6 Blank

TABLE II.—COMPANY Z POLYBUTADIENE AGING AT 70° C.

| Stabilizer at 0.5 phr. | 1 | 2 | 3 | 4 | 5 | 6 |
|---|---|---|---|---|---|---|
| Mooney viscosities at 100° C. after at 70° C. for: | | | | | | |
| Initial | 55 | 55 | 56 | 54 | 55 | 55 |
| 2 days | 56 | 55 | 56 | 56 | 56 | 100 |
| 5 days | 58 | 55 | 57 | 58 | 57 | 140 |
| 10 days | 64 | 54 | 61 | 82 | 59 | 158 |
| Color of polybutadiene after aging at 70° C. for: | | | | | | |
| Initial | C | C | C | C | C | C |
| 2 days | C | C | C | C | C | VLY-C |
| 5 days | C | VLA | C | C | C | Y |
| 10 days | C | LA | C | C | C | Y |

Samples of Polybutadiene containing compound 2-[alpha, alpha-(4-hydroxy-2-methyl-5-tert-butyl phenyl)butyl]-6-tert-butyl-p-cresol and Ionol were aged at 100° C. for 10 days. The data in Table III illustrate that Company Z Polybutadiene survived even this severe treatment when this compound of our invention is used. Stock 1 contains 2-[alpha, alpha-(4-hydroxy-2-methyl-5-tert-butyl-phenyl)butyl]-6-tert-butyl-p-cresol, and stocks 2 and 3 contain Ionol.

TABLE III

| Stock | 1 | 2 | 3 |
|---|---|---|---|
| Mooney viscosities at 100° C. after aging at 100° C. for: | | | |
| Initial | 37 | 37 | 36 |
| 5 days | 71 | 154 | 153 |
| 10 days | 113 | 180 | [1] Brittle |

[1] The sample was too brittle to test.

The polybutadiene stocks in table IV contain the following:

Stock
1 Mixture of this invention containing the reaction production of 2 parts m-cresol and 1 part p-cresol alkylated with Gulf Propylene Trimer and bridged with n-butyraldehyde.
2 2-[alpha, alpha-(4-hydroxy-2-methyl-5-tert-butyl pheynyl)butyl]-6-tert-butyl-p-cresol
3 Blank
4 Antioxidant 2246
5 Santowhite Powder
6 Mixture of this invention containing 17% 4,4'-butylidenebis(6-tert-butyl-m-cresol), 18% 2,2'-butylidenebis(6-tert-butyl-p-cresol), and 55% 2-*alpha, alpha*-(4-hydroxy-2-methyl-5-tert-butyl-phenyl)butyl]-6-tert-butyl-p-cresol 1. The sample was too brittle to test.

TABLE IV.—COMPANY Z POLYBUTADIENE AGING AT 70° C.

| Stabilizer at 0.5 phr. | 1 | 2 | 3 | 4 | 5 | 6 |
|---|---|---|---|---|---|---|
| Mooney viscosities at 100° C. after aging at 70° C. for: | | | | | | |
| Initial | 49 | 49 | 49 | 48 | 48 | 48 |
| 5 days | 57 | 50 | 61 | 49 | 56 | 53 |
| 10 days | 68 | 53 | 143 | 49 | 70 | 60 |
| Color of polybutadiene after aging at 70° C. for: | | | | | | |
| Initial | C | C | C | C | C | C |
| 5 days | C | C | C | LA | C | C |
| 10 days | C | C | LY | LA | C | C |

The compounds and mixtures of this invention are useful antioxidants in cured polymers. The data in Tables V and VI illustrate white natural rubber vulcanizates containing 2-[alpha, alpha-(4-hydroxy-2-methyl-5-tert-butyl phenyl)butyl]-6-tert-butyl-p-cresol and mixtures of this invention compared to a blank and Santowhite Powder. The natural rubber vulcanizates in Tables V and VI contain the following:

| | Parts |
|---|---|
| Pale Crepe Rubber | 100.0 |
| Zinc Oxide surface treated with Propionic Acid | 25.0 |
| Titanium Dioxide Filler | 50.0 |
| Stearic Acid | 1.0 |
| Antioxidant | 2.0 |

The Ozone data in Table V indicate the time to 80 percent retention during dynamic ozone exposure. The method used for measuring the ozone damage to vulcanized rubber is described by Decker and Wise, "The Stress Relaxation Method for Measuring Ozone Cracking," Rubber World, Apr., 1962, page 66. The Ultimate Tensile Strength data in Tables V and VI are in lbs./in.$^2$. The samples are aged in an aluminum block at 100° C.

TABLE V

| | Ultimate tensile stength | | | Ozone to 80% retention |
|---|---|---|---|---|
| | Unaged | At 24 hrs. | At 48 hrs. | |
| Blank | 3,500 | 2,600 | 1,800 | 50 |
| 2-[alpha, alpha-(4-hydroxy-2-methyl-5-tert-butyl phenyl) butyl]-6-tert-butyl-p-cresol | 3,400 | 2,900 | 2,600 | 64 |
| Santowhite powder | 3,500 | 2,800 | 2,400 | 42 |
| Mixture of this invention [1] | 3,500 | 3,100 | 2,400 | 59 |
| Mixture of this invention [2] | 3,400 | 3,000 | 2,300 | 52 |

[1] The mixture contains 18% 2,2'-butylidene-bis(6-tert-butyl-p-cresol), 53% 2-[alpha, alpha-(4-hydroxy-2-methyl-5-tert-butyl phenyl)butyl]-6-tert-butyl-p-cresol, and 17% 4,4'-butylidene-bis(6-tert-butyl-m-cresol).

[2] The mixture contains 13.7% 2,2'-butylidenebis(6-tert-butyl-p-cresol), 41.6% 2-[alpha, alpha-(4-hydroxy-2-methyl-5-tert-butyl phenyl)butyl]-6-tert-butyl-p-cresol, and 48% 4,4'-butylidenebis(6-tert-butyl-m-cresol).

TABLE VI

| | Ultimate tensile strength | | |
|---|---|---|---|
| | Unaged | At 24 hrs. | At 48 hrs. |
| Blank | 3,700 | 2,600 | 1,800 |
| Mixture [1] | 3,500 | 3,100 | 2,700 |
| Mixture [2] | 3,600 | 3,300 | 2,800 |
| 2-[alpha, alpha-(4-hydroxy-2-methyl-5-tert-butyl phenyl)-butyl]-6-tert-butyl-p-cresol | 3,600 | 3,300 | 3,000 |
| Santowhite powder | 3,700 | 3,400 | 3,100 |

[1] Mixture of this invention containing the reaction product of 2 parts m-cresol and 1 part p-cresol alkylated with Gulf Propylene Trimer and bridged with n-butyraldehyde.

[2] Mixture of this invention containing 17% 4,4'-butylidenebis-(6-tert-butyl-m-cresol), 18% 2,2'-butylidenebis(6-tert-butyl-p-cresol), and 55% 2-[alpha, alpha-(4-hydroxy-2-methyl-5-tert-butyl phenyl)butyl]-6-tert-butyl-p-cresol.

The word alkyl which defines R on the alkylated cresol includes cycloalkyl for purposes of this invention. For example, mixtures of cycloalkylated m-cresols and cycloalkylated p-cresols can be used as starting materials for the bridged compounds and mixtures of this invention. Examples of such starting materials are cyclohexyl m, p-cresol and cyclooctyl m, p-cresol.

The antidegradants of this invention are effective in polymers at concentrations of 0.25 to 10.0 parts per hundred. Concentrations from 0.25 to 3 parts per hundred are preferred. Comparable results to those in the tables, supra, demonstrating utility are obtained with antidegradants of this invention which are not illustrated. The antidegradants of this invention may be used in homopolymers, copolymers, and terpolymers of olefins, diolefins, and related monomers. Antidegradant properties comparable to those illustrated in polybutadiene and natural rubber are obtained in other polymers, for example styrene-butadiene rubber, butyl rubber, ethylene-propylene diene monomers, polyethylene, polypropylene, and copolymers of butadiene with other monomers such as styrene acrylonitrile, isobutylene, or methyl methacrylate.

It is intended to cover all changes and modifications of the examples of the invention herein chosen for purposes of disclosure which do not constitute departures from the spirit and scope of this invention.

1. We claim

1. The product obtained by reacting about 1 to 2 parts alkylated m-cresol and about 1 part alkylated p-cresol, wherein the alkyl is secondary or tertiary alkyl of 4 to 12 carbon atoms, with an aliphatic aldehyde of 2 to 7 carbon atoms,

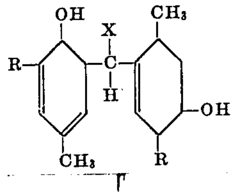

2. An antidegradant mixture comprising about 10 to 20 parts 2,2'-butylidenebis(6-tert-butyl-p-cresol), about 15 to 20 parts 4,4'-butylidenebis(6-tert-butyl-m-cresol) and about 40 to 55 parts 2-[alpha, alpha-(4-hydroxy-2-methyl-5-tert-butyl phenyl)butyl]-6-tert-butyl-p-cresol.

* * * * *

UNITED STATES PATENT OFFICE
CERTIFICATE OF CORRECTION

Patent No. 3,620,980 Dated November 16, 1971

Inventor(s) Evan Johnson Young and Charles Gene Summers

It is certified that error appears in the above-identified patent and that said Letters Patent are hereby corrected as shown below:

The formula in the ABSTRACT has some bonds missing in the rings. It should read :

" 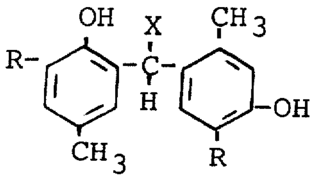 "

Column 1, line 36, "1 positioned" should read "one hydroxy positioned".

Column 1, line 60, the formula has some bonds missing in the rings and should read:

" 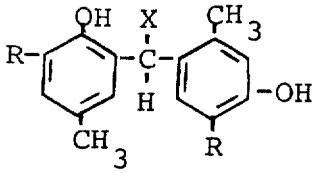 "

Column 2, line 30, the formula has some bonds missing in the right hand ring and should read:

" 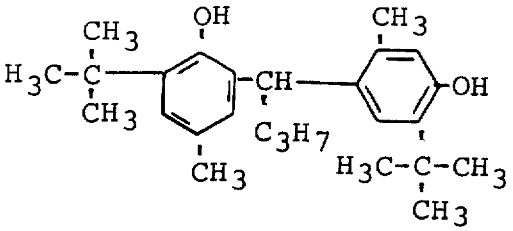 "

FORM PO-1050 (10-69)

USCOMM-DC 60376-P69
☆ U.S. GOVERNMENT PRINTING OFFICE 1969 O—366-334

UNITED STATES PATENT OFFICE

CERTIFICATE OF CORRECTION

Patent No. 3,620,980 Dated November 16, 1971

Inventor(s) Evan Johnson Young and Charles Gene Summers

It is certified that error appears in the above-identified patent and that said Letters Patent are hereby corrected as shown below:

Column 2, line 45, "dresol" should read "cresol".

Column 2, line 53, insert "butyl" omitted after "butyl phenyl)" so as to read "butyl phenyl)butyl]-6-tert-butyl-p-cresol,".

Column 3, line 26, insert "5" omitted between "methyl- -tert" so as to read "methyl-5-tert".

Column 3, line 26, "phenol" should read "phenyl".

Column 3, line 41, insert prime ' omitted after "4,4 -" so as to read "4,4'-butylidenebis(6-tert-butyl-m-".

Column 3, line 43, "pheyl" should read "phenyl".

Column 3, line 47, "butyl-m-cresol" should read "butyl-p-cresol" and "in" immediately following "cresol)" should read "is".

Column 3, line 50, insert "%" omitted after "3" so as to read "3% silicone gum rubber".

Column 6, extreme right column of figures at top of page (extension of Table I under the heading "Company Y"), line 2, "37" should read "31".

Column 5, lines 15-25 describing the stocks for Table II, Stock 1 delete "-tert-butyl-M-cresol)" second occurrence and insert "18" after the comma and before "%" at the beginning of line 18. Remove "%" in front of "2 Antioxidant 2246" (Stock 2).

Column 5, line 29 in the heading of Table II reading "Mooney viscosities at 100°C. after at 70°C. for:", insert "aging" between "after" and "at".

RM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,620,980 Dated November 16, 1971

Inventor(s) Evan Johnson Young and Charles Gene Summers

It is certified that error appears in the above-identified patent and that said Letters Patent are hereby corrected as shown below:

Column 5, line 42, "Company Z" should read "Company Y's".

Column 5, lines 55 and 72, the footnote "1" appears twice. In line 72 cancel "1. The sample was too brittle to test."

Column 5, line 60, Stock 1, "production" should read "product".

Column 5, line 64, Stock 2, "pheynyl" should read "phenyl".

Column 8, line 7, Part of an Examiner's Amendment is omitted in Claim 1 and some of the bonds required to indicate benzene rings are missing in the rings. Corrected Claim 1 is reproduced below:

"1. The product obtained by reacting about 1 to 2 parts alkylated m-cresol and about 1 part alkylated p-cresol, wherein the alkyl is secondary or tertiary alkyl of 4 to 12 carbon atoms, with an aliphatic aldehyde of 2 to 7 carbon atoms, said mixture containing at least about 40% of a compound of the formula

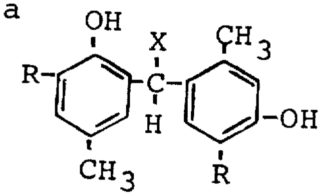

wherein R is secondary or tertiary alkyl of 4 to 12 carbon atoms and X is straight or branched chain primary, secondary or tertiary alkyl of 1 to 7 carbon atoms."

Column 8, line 20, "15 to 20" should read "15 to 50".

Signed and sealed this 18th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
* U.S. GOVERNMENT PRINTING OFFICE : 1969 O—366-334